J. H. WILLIAMS.
ANIMAL MUZZLE.
APPLICATION FILED MAY 12, 1916.

1,210,244.

Patented Dec. 26, 1916.
2 SHEETS—SHEET 1.

Inventor
J. H. Williams,
By Victor J. Evans
Attorney

Witnesses

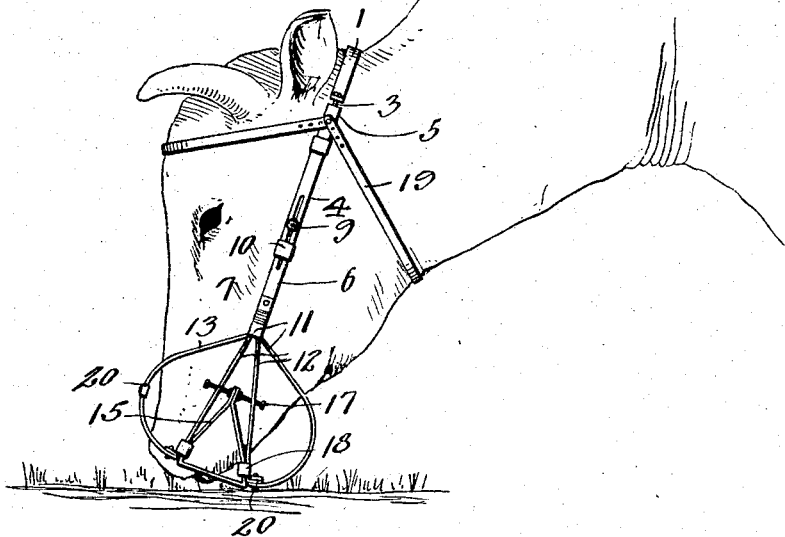
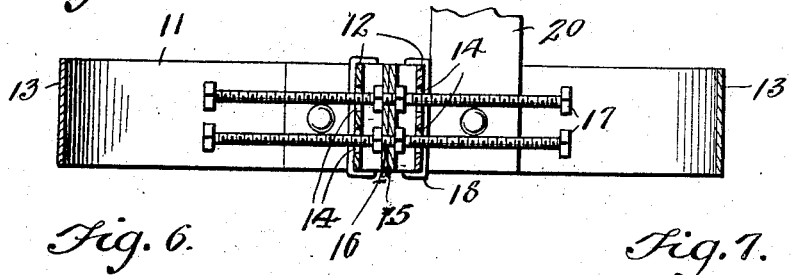
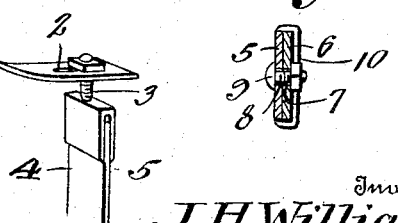

UNITED STATES PATENT OFFICE.

JOHN H. WILLIAMS, OF SHELBY, MISSISSIPPI.

ANIMAL-MUZZLE.

1,210,244.  Specification of Letters Patent.  Patented Dec. 26, 1916.

Application filed May 12, 1916. Serial No. 97,134.

*To all whom it may concern:*

Be it known that I, JOHN H. WILLIAMS, a citizen of the United States, residing at Shelby, in the county of Bolivar and State of Mississippi, have invented new and useful Improvements in Animal-Muzzles, of which the following is a specification.

This invention relates to improvements in animal muzzles and has particular application to a muzzle which opens and closes upon the downward and upward movement of the head of the animal.

In carrying out the present invention, it is my purpose to provide a muzzle which will open when the animal lowers its head so that such animal may graze upon the low tender grass, and which will close when the animal elevates its head, thereby preventing the animal from eating growing crops.

It is also my purpose to provide a muzzle of the class described which may be readily and conveniently applied to the animal and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

Figure 1:
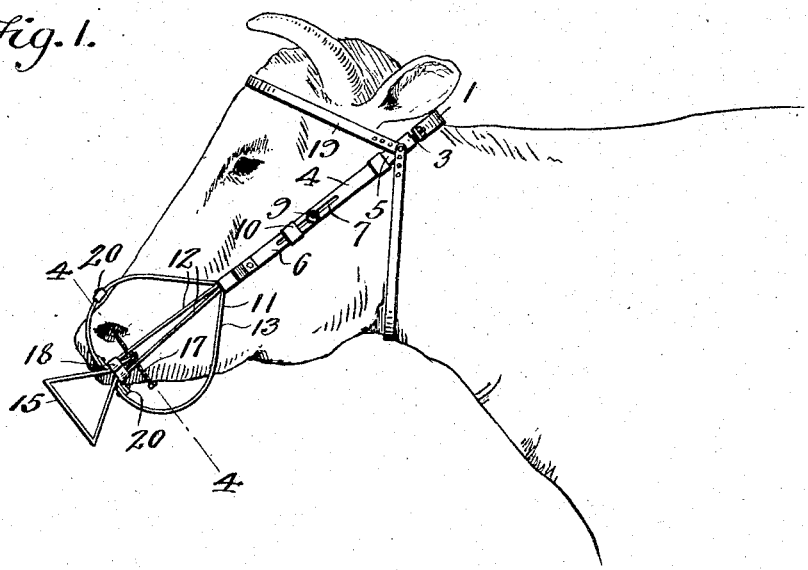
Figure 3:
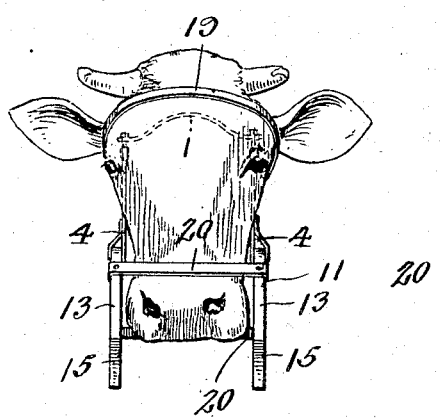
Figure 5:
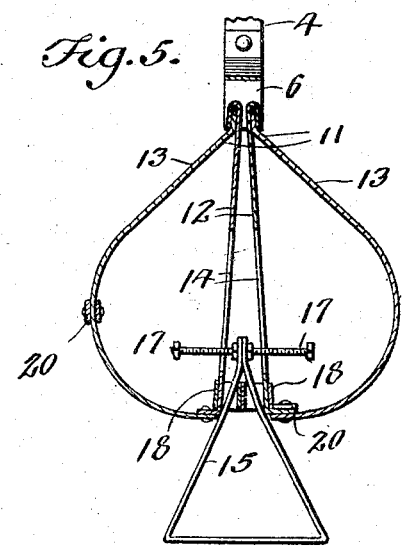

In the accompanying drawings: Figure 1 is a view in side elevation of a muzzle constructed in accordance with the present invention, the same being shown as applied to an animal and in closed position. Fig. 2 is a similar view showing the animal's head lowered and the muzzle open. Fig. 3 is a front view of the muzzle applied to the animal's head. Fig. 4 is an enlarged fragmentary side elevation of one of the adjustable straps. Fig. 5 is a vertical sectional view through the lower end of the muzzle showing the mounting for the opening wedges. Fig. 6 is a perspective view of the head piece. Fig. 7 is a section through the side straps and the connecting bolt.

Referring now to the drawings in detail, 1 designates a head piece adapted to be arranged across the head of the animal and formed in the opposite ends of the head piece 1 are elongated slots 2. Passed through the slots 2 are bolts 3 and connected to the lower ends of the bolts 3 and depending from the head piece are side straps 4. These side straps 4 are of suitable length and each embodies two sections 5 and 6. The corresponding ends of the sections 5 and 6 of each strap are placed in overlapping engagement and the outer end of the section 5 is connected to the corresponding bolt 3, while formed in the section 5 adjacent to the other end thereof is a longitudinal slot 7 alining with an opening 8 in the section 6. Passed through this opening and slot is a clamping bolt 9 whereby the sections may be held in adjusted position. Also connected to the lower end of the section 5 of each strap is a clip 10 surrounding the section 6 and acting to hold the sections in proper relative position in the adjusting thereof. Pivotally connected to the lower end of the straps are pairs of jaws 11 respectively. Each jaw comprises a vertical strip 12 and a semicircular strip 13 having the ends thereof fastened to the ends of the strip 12. The strips 12 of the jaws of each pair are placed face to face, while the strips 13 project outwardly in opposite directions. Formed in the strips 12 of each pair of jaws are alining elongated slots 14.

15 designates triangular shaped wedging elements. In the present instance, each wedging element is formed of a single strip of metal bent into triangular form and the ends of the metal so bent are projected upwardly between the corresponding jaws and formed in these upwardly projecting ends are openings 16 alining with the slots 14. Passed through these alining openings and slots are bolts 17 acting to hold the wedging elements connected to the jaws. Secured to the jaws of each pair at the lower ends of the vertical strips are guide clips 18 that receive the sides of the wedging elements.

The side straps 4 are preferably equipped with an adjustable head band 19 acting to hold such straps securely upon the head of the animal.

In practice, the muzzle is secured to the head of the animal by means of the head piece 1 and the head band 19 and the mouth of the animal is disposed within the spaces between the jaws 11. Connected to the curved strips 13 of the jaws of each pair are transverse bars 20 spaced apart a distance sufficient to prevent opening of the mouth of the animal when the jaws are closed. When the animal lowers its head the wedging elements 15 depending from the jaws engage the ground and move upwardly between the jaws, thereby forcing the latter open and spreading the bars 20 so that the animal may graze on the low grass. When, however, the animal elevates its head, the wedging elements 15 drop to normal position and the jaws close, thereby bringing the bars 20 together to prevent opening of the mouth of the animal.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. A muzzle comprising pairs of jaws adapted to be disposed at the opposite sides of the head of the animal, means for supporting said jaws upon the head of the animal, cross bars carried by the corresponding jaws of the pairs and acting normally to prevent opening of the mouth of the animal, and wedging elements carried by said jaws and adapted to open the latter upon contact with the ground whereby said bars will be spread apart.

2. A muzzle comprising pairs of jaws adapted to be disposed at the opposite sides of the head of the animal, means for supporting said jaws upon the head of the animal, cross bars carried by the corresponding jaws of the pairs and acting normally to prevent opening of the mouth of the animal, and triangular shaped wedging elements carried by said pairs of jaws and adapted to move upwardly upon contact with the ground to open the jaws to spread apart said bars.

3. An adjustable muzzle for animals comprising pairs of jaws adapted to be disposed at the opposite sides of the head of the animal, the jaws of each pair embodying vertical strips placed face to face, and semicircular strips having the ends thereof secured to the ends of said vertical strips respectively and projecting in opposite directions, means for holding said jaws in proper position upon the head of the animal, bars carried by the corresponding jaws of the pairs and acting normally to hold the mouth of the animal closed, and wedging elements carried by said vertical strips and normally depending below the jaws and adapted to pass between the jaws upon contact with the ground whereby the jaws will be opened and said bars spread apart.

In testimony whereof I affix my signature in presence of two witnesses.

JOHN H. WILLIAMS.

Witnesses:
JOHN J. COLVIN,
R. E. HUTCHINSON.

Copies of this patent may be obtained for five cents each, by addressing the "Commissioner of Patents, Washington, D. C."